United States Patent [19]

zur Heiden et al.

[11] 4,079,377
[45] Mar. 14, 1978

[54] FM-CW RADAR FOR RANGE AND RELATIVE SPEED DETERMINATION

[75] Inventors: Dietmar zur Heiden, Gerlingen; Guenter Neininger, Ludwigsburg; Eike Sautter, Ditzingen; Dieter Klippel, Stuttgart, all of Germany

[73] Assignee: International Standard Electric Corporation, New York, N.Y.

[21] Appl. No.: 672,760

[22] Filed: Apr. 1, 1976

[30] Foreign Application Priority Data

Apr. 4, 1975 Germany .............................. 2514868

[51] Int. Cl.² .............................................. G01S 9/44
[52] U.S. Cl. ...................................................... 343/9
[58] Field of Search .............................................. 343/9

[56] References Cited

U.S. PATENT DOCUMENTS

| | | | |
|---|---|---|---|
| 3,373,426 | 3/1968 | Miller, Jr. | 343/9 X |
| 3,898,656 | 8/1975 | Jensen | 343/9 X |
| 3,898,659 | 8/1975 | Jensen et al. | 343/9 X |
| 3,900,872 | 8/1975 | Jensen et al. | 343/9 |
| 3,905,034 | 9/1975 | Jensen et al. | 343/9 |
| 3,952,303 | 4/1976 | Watanabe et al. | 343/9 |

Primary Examiner—Malcolm F. Hubler
Attorney, Agent, or Firm—William T. O'Neil

[57] ABSTRACT

An FM-CW vehicular distance and relative speed measuring device which compares instantaneous reflection signal frequency to the instantaneous FM-CW transmitted frequency to derive distance (range) and speed information. Searching means including a mixer, frequency programmer, and logic circuits evaluates a plurality of fractional range increments for signal presence and Doppler spectrum evaluation to determine relative velocity with sense. The FM-CW waveform is a sawtooth and means are included for blanking the sawtooth flyback.

7 Claims, 11 Drawing Figures

FM-CW RADAR FOR RANGE AND RELATIVE SPEED DETERMINATION

BACKGROUND OF THE INVENTION

1. Field of the Invention

The present invention relates to FM-CW range and relative speed measuring devices.

2. Description of the Prior Art

A device of the kind to which the invention relates is described in German Pat. No. 867,709. The device described therein is a frequency-modulated continuous-wave radar device, which will hereinafter be referred to as an "FM-CW device." In such FM-CW equipment, superposition of the signals reflected from the target on the local signal results in distance-and-speed dependent beat-note signals from which distance and relative speed may be determined.

The particular embodiments described in the aforementioned representative prior art can be divided into two groups, viz; those which determine speed and range simultaneously, and those which make those measurements sequentially.

In the first instance, two transmitter-receiver units are required. To measure distance, (range), a signal frequency-modulated in a sawtooth mode is radiated by the first transmitter. To measure the relative speed, an unmodulated signal is simultaneously radiated by the second transmitter. The evaluation of distance and relative speed reflection signals takes place simultaneously in the receivers.

In the second instance, only one transmitter-receiver unit is required, which alternately transmits frequency-modulated and unmodulated signals; or alternatively, the transmissions may be frequency-modulated in a triangular mode. The received signals are evaluated with respect to distance and relative speed one after the other or, if suitable storages are provided, they may be contemporaneously processed albeit not entirely in real time. If the radiated signals are exclusively those frequency-modulated in a triangular mode, the sign of the relative speed cannot be determined.

SUMMARY OF THE INVENTION

It may be said to be the general object of the invention to provide a device for simultaneously measuring distance and relative speed, by the reflection method, said device having only one transmitter-receiver unit, and wherein distance and relative speed, including the sign of the relative speed, are derived simultaneously from the same received signal.

Although only one transmitter-receiver unit is provided, simultaneous evaluation of the beat-note signal with respect to distance and relative speed, including the sign of the relative speed, is possible without the use of memories (signal storage).

To measure distance, the range to be monitored is searched within a short period of time. The search is interrupted only when a target has been detected. Then, in addition to the distance, the relative speed is measured. The measurement can be so controlled that the speed of only one target or the speeds of several selected targets are determined. The device will operate well, even if several targets are present in the range to be monitored.

The novel device is especially suited for use as an automotive traffic (radar) monitor.

DESCRIPTION OF THE PREFERRED EMBODIMENT

At the outset, the operation of known FM-CW devices will be described with the aid of FIG. 1.

Figure 1A:
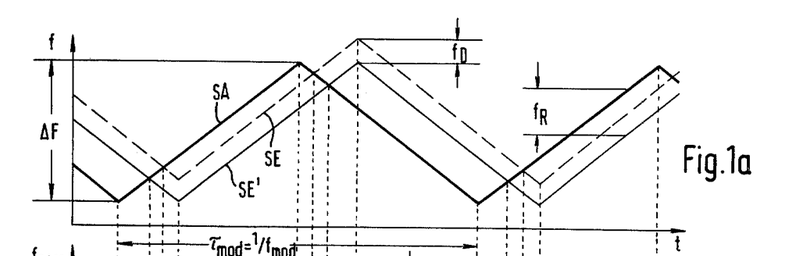
FIG. 1 consists of waveform diagrams explaining prior art FM-CW devices (FIGS. 1a to 1d), and the FM-CW device in accordance with the invention (FIGS. 1d to 1f).

The signals SA are frequency-modulated in a triangular mode (FIG. 1a). It is assumed that the modulation frequency $f_{mod}$ is (for example) 20 kHz, the frequency deviation $\Delta F$ 60 MHz, and the carrier frequency $f_o = 16.5$ GHz. If the radiated signal SA is reflected from a stationary target, a first signal SE' will be received. If the target is moving, the device will receive a second signal SE whose frequencies differ from the frequencies of the first signal SE' by the Doppler shift $f_D$ caused by the moving target.

Figure 1B:
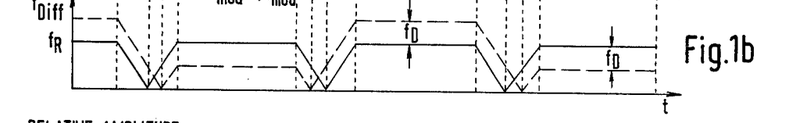

By mixing the transmitted signal SA with the received signal SE, a difference frequency $f_{Diff}$ is obtained whose variation with time is shown in FIG. 1b, and which is proportional to the distance. The solid curve of FIG. 1b shows the difference frequency $f_{Diff}=f_R$ for a fixed target, while the dashed curve gives the difference frequency $f_{Diff}$ for a moving target.

In the case of a moving target, the difference frequency allotted to a fixed target is reduced by the amount of the Doppler shift $f_D$ during the time the transmitted frequency increases, whereas during the time the transmitted frequency decreases, the difference frequency is correspondingly increased. At the times the frequencies of the radiated and received signal are equal to one another, the difference frequency $f_{Diff}$ is zero. At the zeroes the beat-note signal (video signal) experiences phase jumps (distontinuities).

Figure 1C:
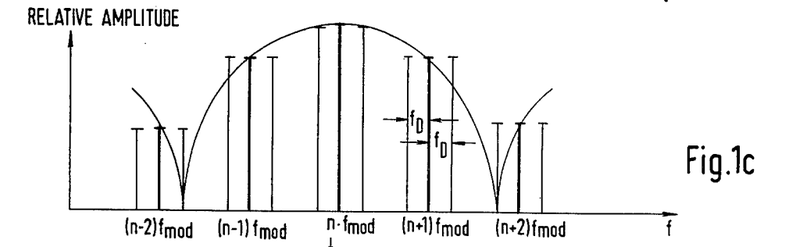

Since the video signal is periodic (cycle $\tau_{mod} = 1/f_{mod}$), the result is not a frequency line proportional to the distance, but a frequency spectrum having a sin x/x shape (FIG. 1c), with the maximum of the envelope corresponding to the two-way distance (transmitter-to-target and back to the receiver). In the case of stationary targets, all frequency lines of the video spectrum lie at integral multiples of the modulation frequency, as shown in FIG. 1c by heavy lines. By constrast, if there is a relative movement, Doppler sidelines (shown as thin lines) will occur below and above the stationary-echo lines (not present in that case). Because of the symmetry of the traingularly modulated wave, both Doppler sidelines are present, irrespective of the direction of movement; thus, determination of the Doppler-frequency sign (sense of the relative motion) is impossible.

Figure 1D:
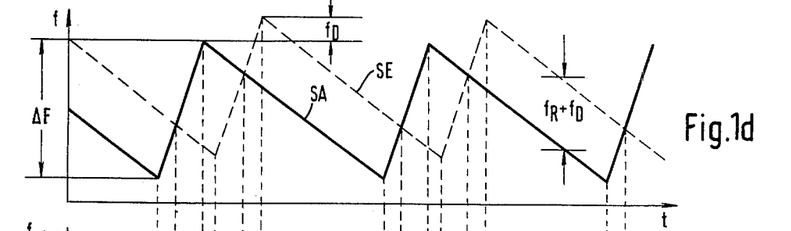
Figure 1E:
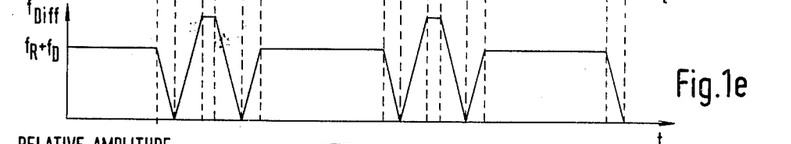

To make such a relative speed sense determination, the present invention utilizes unsymmetrical frequency modulation, as illustrated in FIG. 1d. The difference frequency $f_{Diff}$ (FIG. 1e) is now uniformly higher by the amount of the Doppler frequency $f_D$ (for approaching targets) and lower by the Doppler frequency (for targets moving away).

The echo spectrum caused by the modulating-signal return, which is of much shorter duration (rising portion of the sawtooth curve in FIG. 1d), is higher in frequency by the factor proportional to rise time divided by decay time, and consequently, is separated from the actual useful spectrum.

Figure 1F:
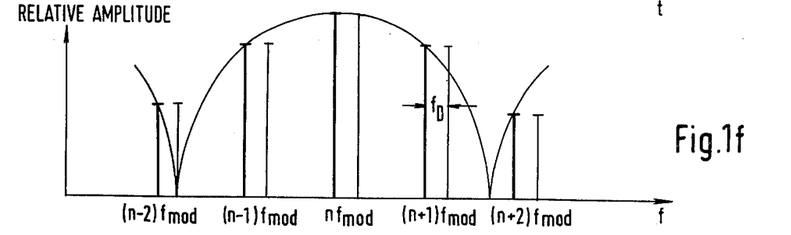

The frequency spectrum of the video frequency signal in the device of the invention is shown in FIG. 1f. Its envelope maximum is assigned to the distance. Since, however, only the lower or upper Doppler sidelines are now present — depending on whether the target is moving away (increasing relative range) or coming closer (decreasing relative range), and the sign (sense) of the relative speed can be determined by means of the evaluating device described hereinafter.

With the FM-CW device according to the invention, the distances from several targets and the relative speeds of the targets can be measured. In many cases, particularly in automobile radar sets, distances from all targets may be of interest, but only the relative speeds of the closest targets are of interest. The FM-CW device may be constructed according to the particular requirements, i.e., in accordance with whether the relative speeds of one, several or all targets are to be measured, as a design engineering matter, which will be apparent to the skilled practitioner of this art, once the concepts of the present invention are herefrom understood. This description is given by way of example and refers to an FM-CW device which measures only the relative speed of the closest target.

The design and operation of a typical FM-CW device according to the invention will be described with the aid of FIGS. 2 to 6, FIG. 2 being a block diagram of the entire device.

Figure 2:
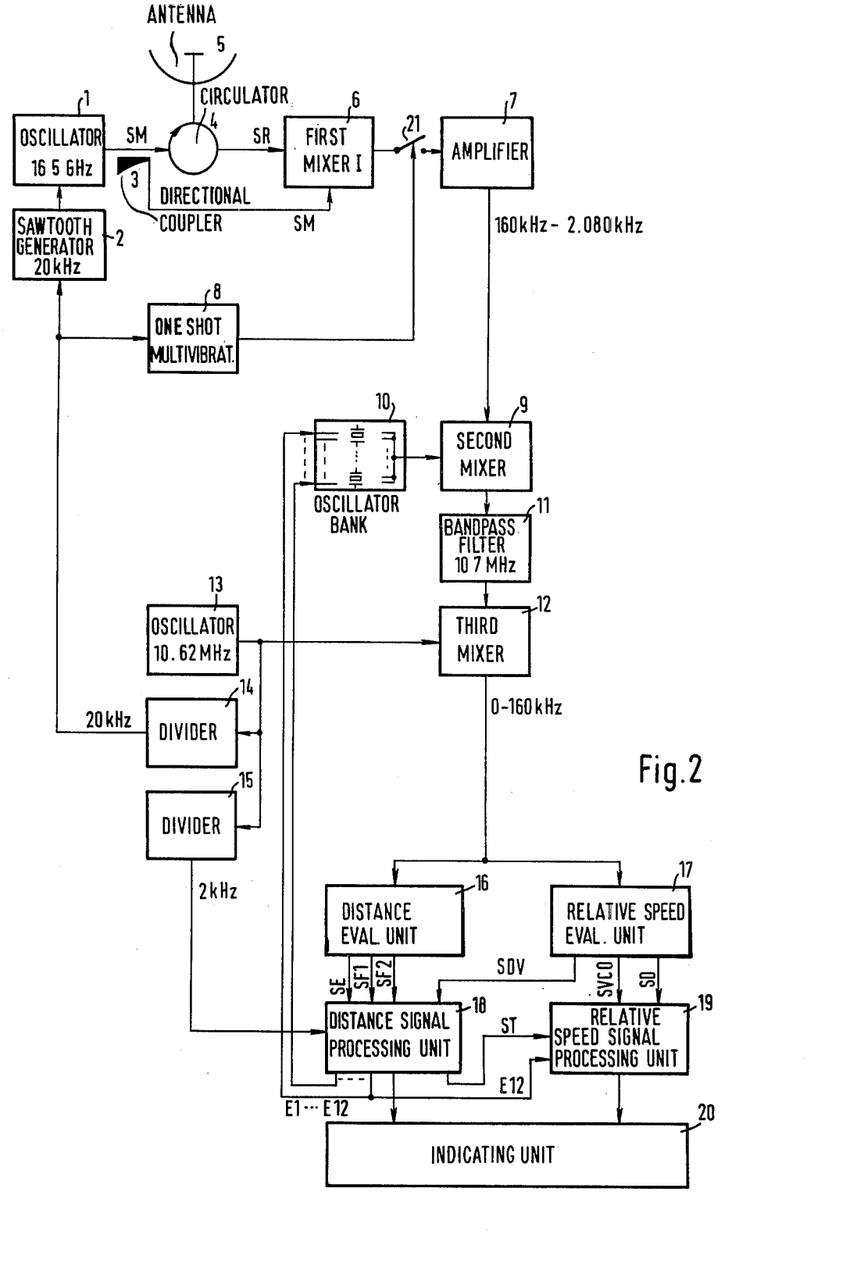
FIG. 2 is a block diagram of the FM-CW device in accordance with the invention.

A signal generated in an oscillator 1 and having the frequency $f_o = 16.5$ GHz is frequency-modulated in a sawtooth mode by a sawtooth generator 2. The frequency-modulated signal SM is fed to an antenna 5 via a circulator 4 and radiated by this antenna.

The assumed modulation frequency $f_{mod}$ is 20 kHz, and the frequency deviation ΔF is 60 MHz. Since the desired high measurement accuracy requires a high stability of the modulation frequency, the latter is generated by dividing, in a divider 14, a 10.62-MHz frequency generated in an oscillator 13.

A first mixer 6 is fed, the signal SR received by the antenna 5, and a small portion of the signal SM which portion is coupled out of the feeder for the circulator 4 by means of a directional coupler 3. By mixing the received signal SR and this coupled-out local signal SM in the mixer 6, a video signal is obtained, which contains the information on distance and relative speed. If the range to be monitored extends from 10m to 130m, the frequency of the video signal will lie between 160kHz and 2,080kHz. The range to be monitored is divided into twelve distance increments each 10m in length. Each distance range is allotted a frequency.

To avoid disturbing useful signal superpositions during the return (fly-back) of the sawtooth modulating signal, a switch 21 controlled at the repetition rate of the modulation frequency by a one-shot (monostable) multivibrator 8 prevents the video signal from being passed on to amplifier 7 during this time. The time constant of multivibrator 8 is equal to the time duration of the said sawtooth fly-back.

The amplified video signal is fed to a second mixer 9, in which it is successively up-converted with different frequencies. These frequencies are generated in an oscillator bank 10, whose control will be described below with reference to FIG. 5.

The individual frequencies are each allotted to a corresponding distance increment range (the frequency 9.66 MHz, for example, corresponding to the distance increment 60m to 70m), i.e., the number of frequencies is equal to the number of these range (or distance) increments.

The second mixer 9 is followed by a steep-slope bandpass filter 11 with a bandwidth of 160 kHz. The bandwidth corresponds to the frequency width of each of the distance increments. The center frequency of the filter 11 is 10.7 MHz. At the output of the filter 11 a signal is present only if the video signal was mixed in the second mixer 9 with the frequency allotted to the distance increment within which a particular target is located. Thus, if the mixing frequency is known, the increment in which the target is located will be known.

In a third mixer 12, the frequency of the filter output signal is converted to the frequency range 0 - 160 kHz, in which a circuit for further evaluation of distance and relative speed is readily instrumented. To this end, the filter 11 output signal is mixed in third mixer 12 with a signal having a frequency of 10.62 MHz and generated in the above-mentioned oscillator 13.

The mixer output signal is fed to a distance-evaluating unit 16 and to a relative-speed-evaluating unit 17.

Figure 3:
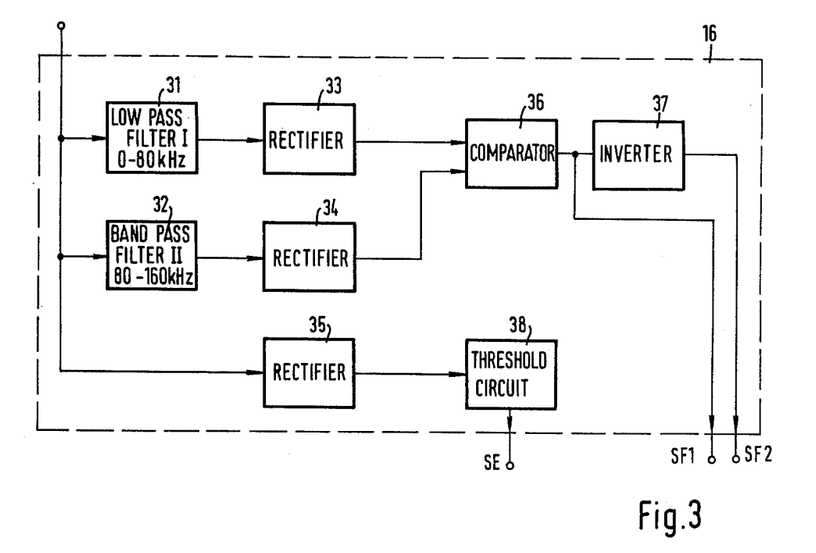
FIG. 3 is a block diagram of the distance-evaluating unit of FIG. 2.

Before completing the description of FIG. 2, the distance-evaluating unit 16 will be individually described with the aid of FIG. 3.

The input signal of the distance-evaluating unit 16 (FIG. 3) is fed to a low-pass filter 31 with a passband from 0 to 80 kHz, to a bandpass filter 32 with a passband from 80 kHz to 160 kHz, and to a first rectifier 35, which is followed by a threshold circuit 38.

Whether or not the video signal has an amplitude sufficient for further distance evaluation this is determined by the threshold setting of the threshold circuit 38, the output thereof being distance signal SE.

The output signals of the low-pass filter 31 and of the bandpass filter 32 are rectified in rectifiers 33 and 34, respectively, and applied to the two inputs of a comparator 36. If the amplitude of the rectified output signal of the low-pass filter 31 is greater than that of the rectified output signal of the bandpass filter 32, a binary 1 will appear at the output of the comparator 36, i.e., a signal SF1 will be available at the output of the distance-evaluating unit. Under the converse conditions, a binary 0 will be present at the output of the comparator 36, and inverter 37 will produce a binary 1 as the distance-evaluating unit output signal SF2.

In accordance with the conditions of signals SF1 and SF2 the 10-m distance increments are now divided into 5-m increments since the condition in which the amplitude of the output signal of the bandpass filter 31 exceeds that of the output signal of the bandpass filter 32, it is known that the target is in the first half of the 10-m distance increment.

Next, the relative-speed-evaluating unit 17 will be described with the aid of FIG. 4.

To evaluate the Doppler frequency magnitude and sign, signal processing is performed around a single spectral line (FIG. 1f) in the frequency range determined by the following equation:

$$nf_{mod} - 1 \text{ kHz} \leq nf_{mod} \leq nf_{mod} + 5 \text{ kHz}$$

To this end, use is made of the line lying in the center ($nf_{mod} = 80$ kHz) of a distance increment (0 to 160 kHz) because in the case of targets lying at the upper limit (160 kHz) thereof, or in the case of targets lying at the lower limit (0 Hz) of that interval, the corresponding 80 kHz line will have an amplitude sufficient for further processing. The above-mentioned band limitation is performed by a bandpass filter 41 with a passband from 79 kHz to 85 kHz. At a frequency of 79 kHz (the Doppler shift is −1 kHz) and the target is therefore moving away at about 30 km/h. At a frequency of 85 kHz (the Doppler shift being + 5 kHz) the target is approaching at a relative speed of about 160 km/h.

Within the frequency range from 79 to 85 kHz, Doppler shifts are obtained between 79 and 80 kHz (−30 km/h to 0 km/h) for targets moving away, and between 80 and 85 kHz (0 km/h to + 160 km/h) for approaching targets. To determine the sign (sense) of the relative speed, a check is performed as to whether the Doppler frequency is greater or smaller than 80 kHz, this determination being described more fully hereinafter.

To determine the relative speed, the above defined frequency range is searched by means of a tunable filter. Since the range to be monitored is searched rapidly, a filter with a short transient response is required.

The transient response time of a filter is proportional to the reciprocal of the absolute bandwidth. Hence, a narrow-band search filter has a long transient response time. Therefore, an N-path filter is especially suited for use as a narrow-band search filter. It will be noted that an N-path filter, controlled at the clock frequency $fTa$, has several passbands whose spacing is given by the clock frequency. Since several passbands are present, additional signal components are passed, and according to the above relation between transient response time and absolute bandwidth. This results in a reduction in transient response time. The center frequency of the first passband, which is not equal to zero, is equal to the clock frequency.

Since, however, the output signal now is no longer unambiguous (several passbands), the N-path filter must be followed by a bandpass filter. The passband of this bandpass filter is equal to the range over which the N-path filter is tuned. This broadbandedness does not significantly change the transient response time of the overall filter system.

By the above-described combination of an N-path filter and followed by a bandpass filter, an effectively narrow-band search filter with a short transient response time is obtained.

Figure 4:
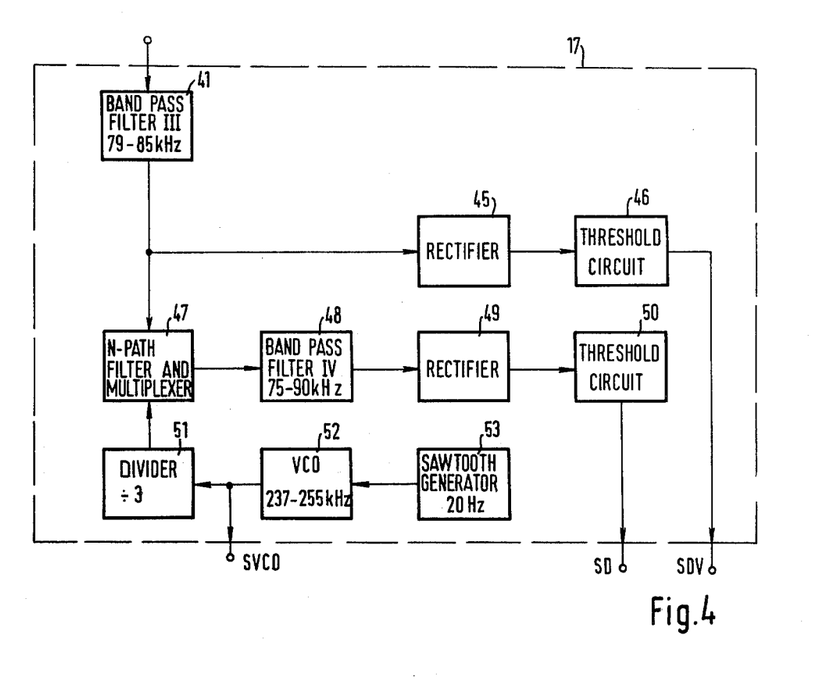
FIG. 4 is a block diagram of the relative-speed-evaluating unit of FIG. 2.

The N-path filter 47 in FIG. 4 consists of three parallel lowpass filters (bandwidth 150 Hz) to which the output signal of the bandpass filter 41 is fed via a time-division multiplex switch. The overall bandwidth of the N-path filter 47 is equal to twice the bandwidth of the individual low-pass filters of the N-path filter 47. The multiplex switch of the N-path filter 47 is controlled by a voltage-controlled oscillator (VCO) 52. The VCO 52 is tuned within 50 ms (20 Hz) over the range from 79 to 85 kHz by a sawtooth signal generated in a sawtooth generator 53, i.e., the multiplex switch of the N-path filter 47 is controlled at frequencies from 79 to 85 kHz.

Thus the N-path filter 47 is a search filter for the frequency range from 79 to 85 kHz.

For reasons of accuracy, the VCO 52 is operated at a higher frequency than is necessary for the control of the N-path filter 47. The VCO 52 is tuned over the range 237 to 255 kHz and its output frequency for controlling the N-path filter 47 is divided by 3 in a divider 51.

At the output of the bandpass filter following the N-path filter 47 a signal will be present only if the center frequency of the N-path filter 47 corresponds to the frequency of the Doppler-shifted spectral line.

To determine the relative speed, a relative-speed-signal processing unit 19 measures the frequency at which the VCO 52 oscillates (terminal SVCO of 17) when a signal is present as a control at the output of the bandpass filter 48 (SD of 17).

The output signal of the bandpass filter 41 is also passed to a threshold circuit 46 after having been rectified in a rectifier 45. If this signal has a predetermined amplitude, the threshold circuit 46 will provide a signal SDV.

The output signal of the bandpass filter 48 is rectified in a rectifier 49 and fed to a threshold circuit 50. If this signal has a predetermined amplitude, the threshold circuit 50 will provide signal SD.

The distance-signal-processing unit 18 of FIG. 1 will now be described with the aid of FIG. 5. The signals present at its inputs are as follows:

(1) signals SF1 and SF2, by which a distance range is divided into two partial distance ranges; (2) the signal SE from the distance-evaluating unit 16; (3) the signal SDV from the relative-speed-evaluating unit 17, and (4) a 2-KHz clock signal, which is taken from a divider 15 dividing the frequency of the oscillator 13 down to 2kHz.

The 2-kHz clock signal is applied to the non-inverting input of an inhibit gate 64 and passed to a control device 65. The control device 65 produces output signals E1 to E12. The number of output is equal to the number of distance ranges. The clock signal cyclically switches the control unit from one output to another.

The output signals E1 to E12 are used to control the oscillator bank 10 (FIG. 2). This control causes the input signals of the second mixer 9 to be mixed cyclically at the clock rate (2 kHz) with the various frequencies of the oscillator bank 10, which are allotted each to a discrete distance increment.

Figure 5:
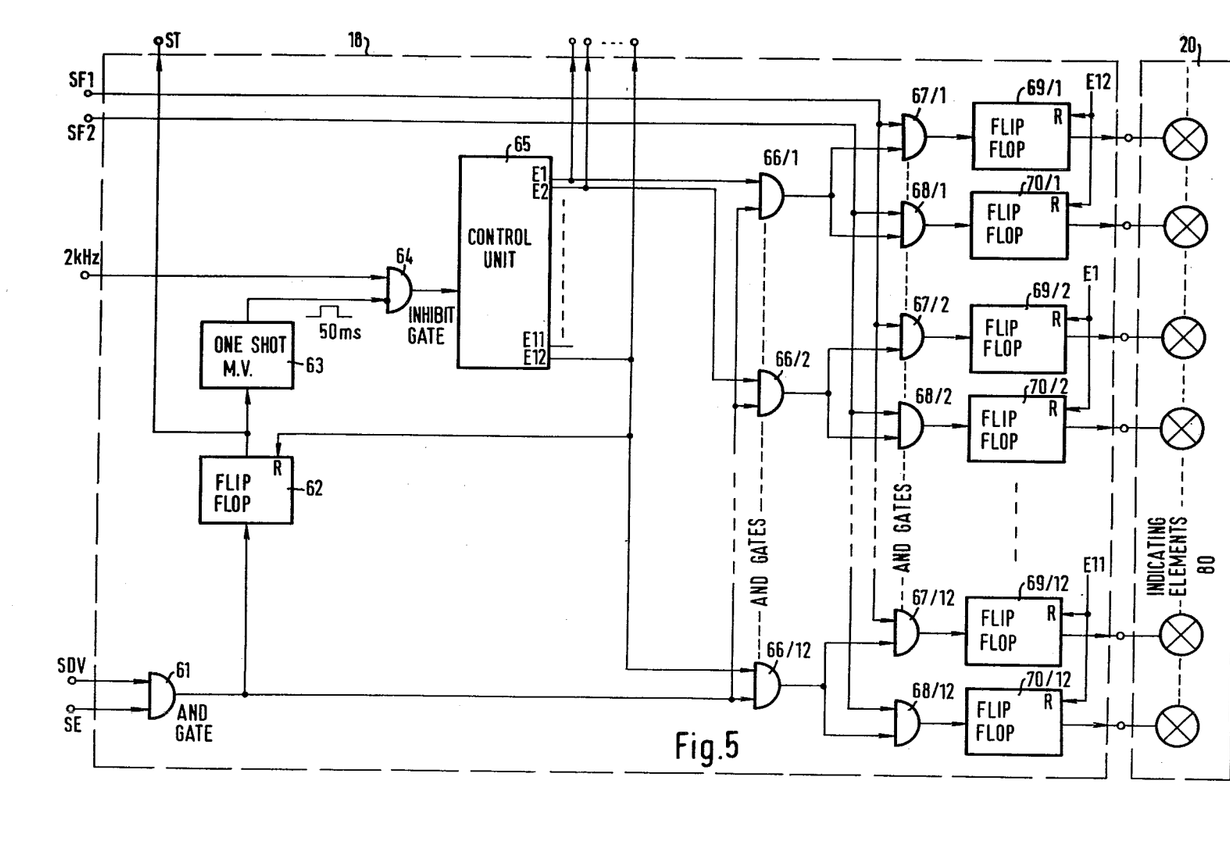
FIG. 5 is a block diagram of the distance-signal-processing unit of FIG. 2.

On FIG. 5, each output signal of the control unit 65 (which is essentially an electronic commutator) is also applied to AND gates 66/1 through 66/12.

The signals SDV and SE are applied to an AND gate 61. The output signal of this AND gate 61 is applied, to the bank of AND gates 66/1 through 66/12 and also to a flip-flop 62. The flip-flop 62 is followed by a one-shot multivibrator 63. The time constant of the one-shot multivibrator 63 is 50 ms (typically), and as such is equal to the time needed to evaluate the Doppler shift. The output signal of the one-shot multivibrator 63 is passed to the inverting input of the inhibit gate 64. As long as this signal is present at the inverting input of this inhibit gate 64, the control unit 65 does not switch (search) to enable the next output. The search is not continued until the one-shot multivibrator 63 has returned to its stable state. The flip-flop 62 is reset by the last output signal E12 of the control circuit 65 by the connection to R of 62. This insures that no relative speeds other than that of the first target are measured.

If it is desired to measure all available relative speeds, the flip-flop 62 is not necessary. If the relative speeds of several targets are to be measured, further flip-flops may be added and suitably controlled, according to the logic of this element's function which will be evident to those skilled in this art from the foregoing.

The output signal ST of the flip-flop 62 is also applied to the relative speed-signal-processing unit 19, as seen from FIG. 2.

The output signals of the AND gates 66/1 through 66/12 are passed to AND gates 67/1 to 67/12 and 68/1 to 68/12. The signal SF1 is applied to the second inputs of the AND gates 67/1 to 67/12, and the signal SF2 is passed to the second inputs of the AND gates 68/1 to 68/12.

Coarse distance is determined by means of the signals E1 to E12 and fine distance is determined from the assignment of the signals SF1 and SF2 to one of the signals E1 to E12.

The output signals of the AND gates 67/1 to 67/12 and 68/1 to 68/12 set corresponding flip-flops 69/1 through 69/12 and 70/1 through 70/12, respectively. Each of these is followed by an indicating element (lamp) 80 of the display unit 20. When an indicator lamp 80 lights up, one knows at which corresponding distance a target is present.

The individual flip-flops of 69 and 70 are reset after each complete switching cycle, e.g., the flip-flop 69/2, which is set only when the signal E2 is present, is reset by the signal E1.

Figure 6:
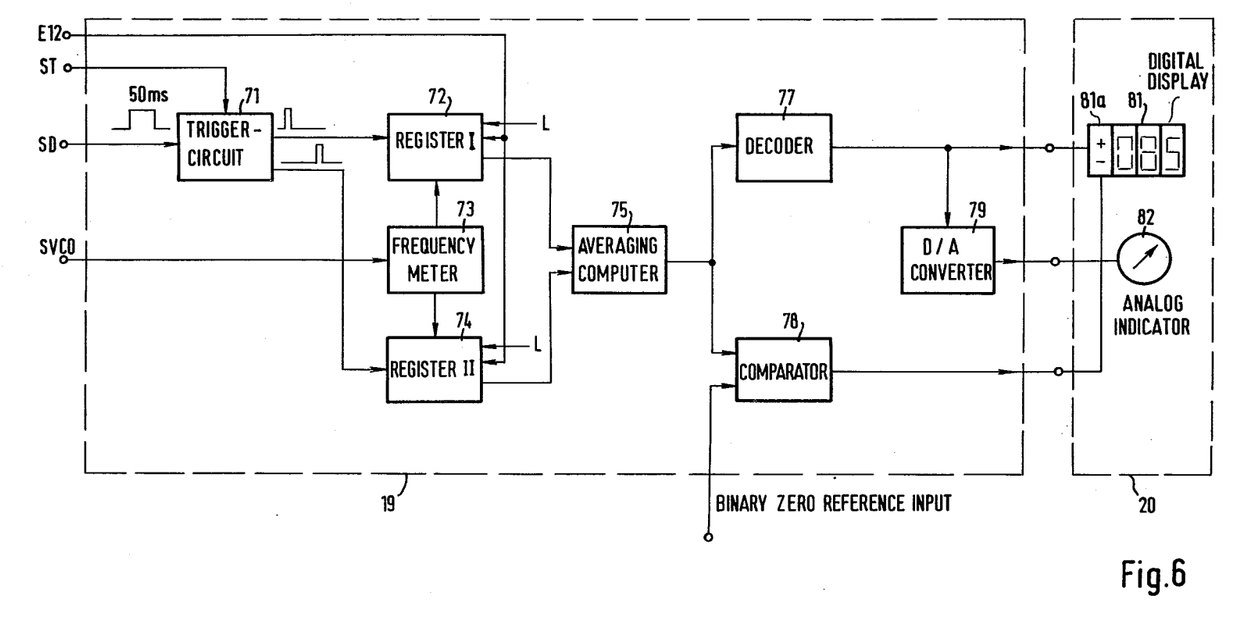
FIG. 6 is a block diagram of the relative-speed-signal-processing unit of FIG. 2.

The relative-speed signal-processing unit 19 will now be described with the aid of FIG. 6.

The output signal ST of the flip-flop 62 of FIG. 5, the signals SVCO and SD from the relative-speed-evaluating unit 17, and the last output signal of the control circuit 65 of FIG. 5 are applied to the inputs of the unit 19, as indicated.

The signal ST controls a trigger circuit 71, which produces a first short pulse at the beginning of the signal SD, and a second short pulse at the end of the signal SD.

The frequency of the signal SVCO is measured in a frequency meter 73. This measured frequency value is stored in binary fashion in two registers 72 and 74. The value present at the beginning of the signal SD is stored in the first register 72, the first pulse serving to enable writing into the register 72, and the second pulse serving to enable writing into the second register 74. The readout of the values stored in the registers 72 and 74 is controlled by a read pulse L; clearing is effected by the last pulse E12 of the switching commutation cycle dictated by unit 65 (FIG. 5).

An averaging computer 75 of a known type averages the two frequency values stored in the register. Such an averaging function can, for example, be accomplished by adding the values stored in 72 and 74 and dividing that sum by two. The output signal of the averaging computer 75 is decoded in a decoder 77 and indicated as the relative speed on an indicating instrument of the indicating unit 20 in digital form 81 or, following digital-to-analog conversion in a D/A converter 79, in analog form 82.

A comparator 78 compares the output signal of the averaging computer 75 on a binary basis with the frequency corresponding to the Doppler shift "zero". The reference frequency is entered into the comparator in the form of a binary word. When the measured frequency is higher than the reference frequency, the target is approaching the FM-CW device; when the measured frequency is lower than the reference frequency, the target is moving away. The sense or sign of the velocity is also transmitted to the indicating unit 20 and indicated there, for example at 81a.

As may be realized from the measurement ranges selected for illustration, the radar set described is intended to be installed into a motor vehicle. One additional use of the invention involves collison avoidance. Such use may involve an additional cpmputer which, taking into account various parameters, can provide a signal only when a collision is possible but still avoidable.

What is claimed is:

1. An FM-CW device for measuring distance and relative speed between a vehicle carrying said device and at least one other vehicle over a predetermined total range, said device including frequency sweep apparatus for transmitting a correspondingly frequency modulated radio frequency wave and for receiving reflected signals from at least said one other vehicle, comprising:
   first means including a first mixer responsive to said transmitted wave and to said reflected signals for generating a beat signal output containing frequency components representing distance and relative speed;
   second means including a second mixer and a programmable local oscillator connected thereto, said second mixer being also responsive to said first means beat signal output, said second means further including means for programming said oscillator through a program of successive frequencies so as to successively examine a predetermined plurality of frequency increments within the frequency limits of said radio frequency modulated wave to provide a second mixer output;
   third means including means synchronous with said frequency sweep apparatus and responsive to said second mixer output for producing an output identifying the distance between said vehicle and said other vehicle;
   and fourth means responsive to said second mixer output of said second means and to the distance identifying output of said third means for generating a relative speed contemporaneous identifying signal by frequency evaluation of said second mixer output during the time of said distance identifying signal from said third means, to produce a relative speed identifying signal corresponding thereto.

2. Apparatus according to claim 1 including apparatus for effecting said frequency modulation according to a sawtooth waveform having a ramp portion and a flyback portion, such that said transmitted frequency varies substantially linearly during the time of said ramp portion.

3. Apparatus according to claim 2, in which means synchronized with said sawtooth waveform are included for disabling the output of said first mixer during said flyback portion of said frequency modulation sawtooth waveform.

4. A device according to claim 3 further defined in that a relative-speed-evaluating unit responsive to the output of said second mixer is included, said unit including a bandpass filter for passing the output signal of said second mixer corresponding to the frequency range of the Doppler shifts expected, and including means defining when the output signal of said bandpass filter exceeds a predetermined amplitude, to generate a fifth control signal transmitted to a distance-signal-processing unit, said Doppler shift being determined by a tunable filter responsive to said bandpass filter ouput, said tunable filter being controlled by a voltage-controlled oscillator associated therewith such that at the frequency of an output signal of the said tunable filter exceeding a predetermined amplitude, a sixth control signal is generated.

5. Apparatus according to claim 2 in which means are included for interrupting the operation of said programmable oscillator at a predetermined frequency in the program corresponding to the distance of said target, to permit said contemporaneous generation of said relative speed identifying signal by said fourth means.

6. Apparatus according to claim 1 including bandpass filter means responsive to said second means for extracting a partial frequency spectrum of the possible spectra extant in said first means beat signal over a full frequency modulation cycle, the bandpass of said filter corresponding to the bandwidth of signals expected within the band assigned to any one of the predetermined distance increments, said apparatus also including a third mixer responsive to said partial spectrum for converting said spectrum to a lower frequency domain facilitating distance and Doppler frequency evaluation and display.

7. Apparatus according to claim 6, further including means for enabling said third and fourth means exclusively when said first mixer output exceeds a predetermined threshold value corresponding to the presence of at least one target within the distance measuring capability of said apparatus.

* * * * *